(12) United States Patent
Lamba

(10) Patent No.: US 9,164,561 B2
(45) Date of Patent: Oct. 20, 2015

(54) METHOD FOR SOURCING CURRENT USING AN AUDIO JACK

(75) Inventor: Kartik Lamba, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 520 days.

(21) Appl. No.: 13/584,710

(22) Filed: Aug. 13, 2012

(65) Prior Publication Data

US 2014/0043742 A1     Feb. 13, 2014

(51) Int. Cl.
  *H04R 1/10*   (2006.01)
  *G06F 1/26*   (2006.01)
  *H04R 5/04*   (2006.01)

(52) U.S. Cl.
  CPC  *G06F 1/266* (2013.01); *H04R 5/04* (2013.01); *H04R 2420/05* (2013.01)

(58) Field of Classification Search
  CPC ............................ H04R 5/04; H04R 2420/05
  USPC ......................................................... 381/74
  See application file for complete search history.

(56) References Cited

U.S. PATENT DOCUMENTS

| 3,435,294 | A | * | 3/1969 | Lemma ........................ 361/91.3 |
| 5,636,284 | A | * | 6/1997 | Pritchard ........................ 381/61 |
| 2004/0080440 | A1 | | 4/2004 | Su et al. |
| 2011/0084147 | A1 | * | 4/2011 | Wilson et al. ................. 235/492 |

FOREIGN PATENT DOCUMENTS

GB  2 383 476   6/2003

OTHER PUBLICATIONS

Robinson, A., S. Verma, and P. Dutta. "Demo Abstract: AudioDAQ: Turning the Mobile Phone's Headset Port into a Universal Data Acquisition Interface." IPSN'12: Proceedings of the 11th International Conference on Information Processing in Sensor Networks: Apr. 16-20, 2012. Beijing, China. pp. 151-152.*
P. Dutta, "Sustainable sensing for a smarter planet," XRDS, vol. 17, No. 4, pp. 14-20, 2011.*
International Search Report and Written Opinion of International Patent Application No. PCT/US2013/054731, filed Aug. 13, 2013. Received Oct. 24, 2013. 11 pages.

* cited by examiner

*Primary Examiner* — Duc Nguyen
*Assistant Examiner* — Kile Blair
(74) *Attorney, Agent, or Firm* — Novak Druce Connolly Bove + Quigg LLP

(57) ABSTRACT

A peripheral device configured to be plugged into an audio jack of an electronic device includes an audio plug having an input terminal; a load electrically connected to the input terminal of the audio plug and configured to draw a first amount of current; a variable resistor electrically connected to the input terminal; a sensor configured to measure a voltage at the input terminal or an amount of current flowing into the load; and a controller that receives a signal from the sensor and is configured to control a resistance of the variable resistor such that a sum of the first amount of current and a second amount of current flowing through the variable resistor is substantially equal to a predetermined current value.

19 Claims, 3 Drawing Sheets

METHOD FOR SOURCING CURRENT USING AN AUDIO JACK

TECHNICAL FIELD

This disclosure relates to circuitry for sourcing current from a power source.

BACKGROUND

Electronic devices, such as mobile phones, can include external connectors for interfacing with peripherals. For example, one external connector can be an audio jack, e.g., an audio socket. The audio jack can be coupled to an audio plug of a pair of headphones, a microphone headset, or other peripheral device. The peripheral device can be coupled with the electronic device using an audio jack plug.

An electronic device can determine whether the peripheral device is plugged in based on comparing the voltage at a terminal of the external connector to a predetermined voltage. The predetermined voltage can be specified by the electronic device. Generally, a compatible peripheral device has a load, e.g., a resistor, that causes the voltage at the terminal to drop below the predetermined voltage when the peripheral device is connected to the terminal. That is, compatible peripherals can be manufactured according to voltage drop requirements of the electronic device. When the electronic device detects that the voltage has fallen below the predetermined voltage, e.g., using voltage detection circuitry, the electronic device determines that the peripheral is plugged in. On the other hand, when the electronic device does not detect that the voltage has fallen below the predetermined voltage, the electronic device determines that nothing is plugged in.

SUMMARY

An electronic device can detect whether a peripheral device is plugged into an external connector of the electronic device. Generally, the electronic device includes a voltage source that is connected to the external connector. The peripheral device can trigger the detection by including a pull down resistor. Coupling the pull down resistor to the external connector causes the voltage at the external connector to drop to a voltage consistent with a specification of the electronic device. After being detected by the electronic device, the peripheral device can communicate with the electronic device.

Some peripheral devices utilize current from a separate battery instead of current from the voltage supply. However, a battery can run out, and uses volume.

The peripheral device can be configured to draw a predetermined current amount from the voltage source. The peripheral device can include, at least, a load and a variable resistor. The load can draw a first current amount to perform operations. For example, the load can process card swipes from a card reader. The first current amount can vary over time based on the performed operations. The variable resistor can be configured to draw a second current amount such that a sum of the first current amount and the second current amount is equivalent to the predetermined current amount.

In one aspect, a peripheral device configured to be plugged into an audio jack of a electronic device includes an audio plug having an input terminal; a load electrically connected to the input terminal of the audio plug and configured to draw a first amount of current; a variable resistor electrically connected to the input terminal; a sensor configured to measure a voltage at the input terminal or an amount of current flowing into the load; and a controller that receives a signal from the sensor and is configured to control a resistance of the variable resistor such that a sum of the first amount of current and a second amount of current flowing through the variable resistor is substantially equal to a predetermined current value.

Implementations can include one or more of the following features. The load is a microprocessor. The sensor measures voltage and the controller uses a feedback loop to control the resistance. The variable resistor comprises a plurality of resistors in series. The variable resistor comprises a plurality of resistors in parallel.

In another aspect, a method of sourcing current from an audio jack of an electronic device includes determining a voltage drop across a load or a first current amount that is passed to the load, wherein the load is powered at least in part by a voltage source; determining, based on the voltage drop or the first current amount, a second current amount to draw from the voltage source using first circuitry; and drawing a second current amount through second circuitry, wherein the second circuitry draws current from the voltage source based on output of the first circuitry, where a sum of the first current amount and the second current amount is substantially equivalent to a predetermined current value, where the predetermined current value is defined by the electronic device.

Implementations can include one or more of the following features. The first circuitry includes an analog to digital convertor, and where the first circuitry outputs a plurality of digital signals to the second circuitry; and where the second circuitry includes a plurality of resistors, where each resistor is coupled to a corresponding switch, and where each switch is controlled by a corresponding digital signal of the plurality of digital signals. Each of the plurality of resistors are in parallel with each other. Each of the plurality of resistors are in series with each other. The second circuitry includes a variable resistor, and where the variable resistor is modified by the first circuitry. The load is a card reader. The second circuitry is in parallel to the load. The load is grounded.

In another aspect, a system for sourcing current from an audio jack of an electronic device includes first circuitry that includes a load and detection circuitry configured to detect a voltage drop across the first circuitry or a first current amount that flows to the first circuitry, where the first circuitry is coupled to a voltage source; second circuitry configured to determine whether to draw a second current amount from the voltage source based on the first current amount or the voltage drop, where the second circuitry is coupled to the detection circuitry; and third circuitry configured to draw current from the voltage source, where portions of the third circuitry is coupled or decoupled to the voltage source based on output of the second circuitry, where the third circuitry is coupled to the voltage source, and where a sum of the first current amount and the second current amount is substantially equivalent to a predetermined current value, where the predetermined current value is defined by the electronic device.

Implementations can include one or more of the following features. The load and the detection circuitry are in series. The second circuitry includes an analog to digital convertor, and where the second circuitry outputs a plurality of digital signals to the third circuitry; and where the third circuitry includes a plurality of resistors, where each resistor is coupled to a corresponding switch, and where each switch is controlled by a corresponding digital signal of the plurality of digital signals. Each of the plurality of resistors are in parallel with each other. Each of the plurality of resistors are in series with each other. The third circuitry includes a variable resistor, and where the variable resistor is adjusted by the output of the second circuitry.

Advantages may include one or more of the following. A peripheral device that connects with an electronic device can have a load that draws different amounts of current while being recognized as plugged in by the electronic device. The peripheral device can include a variable resistor that dynamically changes resistance values based on current draw from the load. The dynamic resistances can draw additional current from the voltage source. The additional current can be used for additional operations, e.g., powering circuitry of the peripheral device or recharging a battery of the peripheral device. In this way, the peripheral device can mimic a standard electret microphone and pull down a supply voltage of the peripheral device to an appropriate voltage.

BRIEF DESCRIPTION OF THE DRAWINGS

Like reference numbers and designations in the various drawings indicate like elements.

DETAILED DESCRIPTION

Figure 1:
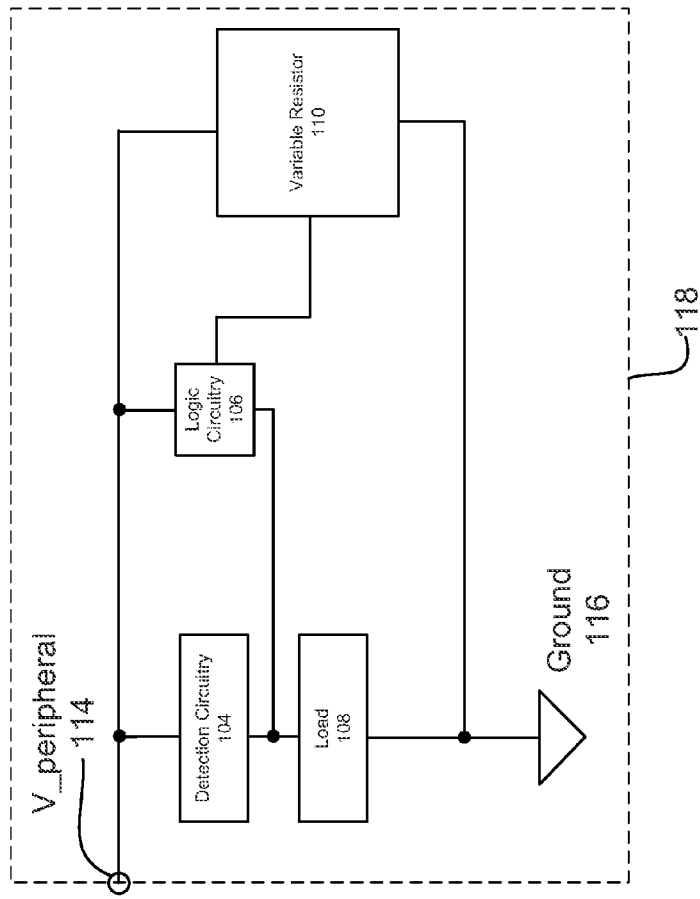
FIG. 1 is a schematic illustration of example architecture for sourcing current using an audio jack.
Figure 1:
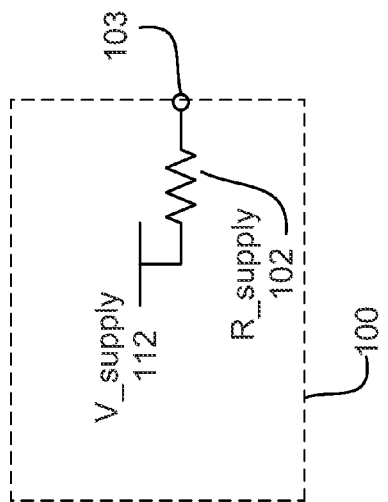

FIG. 1 is a schematic illustration of example architecture for sourcing current using an audio jack of an electronic device 100, e.g., a mobile device, e.g., a smartphone or tablet computer. The electronic device 100 can include a voltage source V_supply 112. The audio jack includes a terminal 103 connected to the voltage source 112 by a resistor R_supply 102.

When nothing is plugged into the audio jack of the electronic device 100, the terminal 103 is open and there is no current flowing from the voltage source 112. In this case, the terminal 103 remains at the voltage V_supply. The electronic device 100 can detect that the terminal 103 is above a threshold voltage, V_threshold, and thus determine that no device is plugged into the audio jack.

A peripheral device 118, e.g., a microphone or a mobile card reader, can be plugged into the audio jack. The electronic device 100 can detect that the terminal 103 is below a threshold voltage, V_threshold, and thus determine that a device is plugged into the audio jack.

In some implementations, in order to determine whether the terminal 103 is above or below the threshold voltage, the electronic device detects a voltage drop across resistor R_supply 102, e.g., using voltage detection circuitry. Alternatively the electronic device can detect a voltage drop between the terminal 103 and ground.

Specifications for the electronic device can require that the peripheral device be configured such that the voltage at the terminal 103 falls to a specified voltage V_peripheral 114 when the peripheral device is plugged into the audio jack. In a conventional headset or the like, the peripheral device includes a resistor that connects the terminal to ground. The resistance of the resistor is such that that the voltage at the terminal falls to the specified voltage V_peripheral. However, this effectively wastes energy; the current flowing through the resistor could be used for other purposes.

The peripheral device 118 can be configured to draw a predetermined current amount from the terminal 103 when it is plugged into the audio jack. The predetermined amount of current is sufficient to cause the voltage at the terminal 103 to fall below the threshold voltage, e.g., to fall to the specified voltage V_peripheral. In some implementations, $I_{predetermined}$ is calculated by the following formula:

$$I_{predetermined} = \frac{V_{supply} - V_{peripheral}}{R_{supply}}$$

The peripheral device 118 can include detection circuitry 104, a load 108, a variable resistor 110, and logic circuitry 106. The detection circuitry 104 and the load 108 can be connected in series with each other. The variable resistor 110 can be connected in parallel with the detection circuitry 104 and the load 108. The logic circuitry 106 can be coupled to the detection circuitry 104. In some implementations, the detection circuitry 104 is in parallel with the load 108. In some other implementations, the logic circuitry 106 includes the detection circuitry 104.

The load 108 includes circuitry that performs operations, e.g., process a swiped card. In some implementations, the load 108 is a mobile card reader. The load 108 can be grounded, e.g., through the connection to the ground in the audio jack. In some implementations, the amount of current drawn by the load 108 varies over time. For example, if the load 108 includes a processor, the processor can use different amounts of power at different times, e.g., depending on the computational load, thereby drawing varying amounts of current. The load 108 can be powered at least in part by current from the terminal 103. In some implementations, the load 108 is also powered by a separate battery.

The detection circuitry 104 is configured to detect a voltage at the input terminal 114, an amount of current that is flowing into the peripheral device 118, or an amount of current that is flowing to the load 108. In some implementations, the detection circuitry 104 includes a current sense resistor. The detection circuitry 104 can measure the voltage drop across the current sense resistor to generate a measurement of current flowing to the load 108. The detection circuitry 104 can include other components, such as a current mirror. The measurement of the voltage drop or the current amount can be received by the logic circuitry 106.

The logic circuitry 106, e.g., a controller, can control the variable resistor 110 based on the measured voltage or amount of current. In some implementations, the logic circuitry 106 includes an analog to digital convertor. The logic circuitry 106 can output one or more digital signals to the variable resistor 110. The digital signals can configure the variable resistor 110 to increase or decrease resistance. This will be described further below in reference to FIGS. 2 and 3.

By increasing or decreasing the resistance, the logic circuitry 106 can cause the variable resistor 110 to draw less or more current, respectively, from the voltage source 112. The logic circuitry 106 can be configured to control the variable resistor 110 to have a resistance such that a sum of the current flowing through the variable resistor 110 and the current flowing through the load 108 is equivalent to the predetermined amount of current. As noted above, the predetermined amount of current can be defined by a specification of the electronic device.

In some implementations, a general formula for determining the amount of current to be drawn by the variable resistor 110 is:

$$I_{Variable\ Resistor\ Circuitry} = I_{Predetermined} - I_{Variable\ Load} - I_{supplemental}$$

$I_{supplemental}$ can be an amount of current that flows through the logic circuitry 106. In some cases, $I_{supplemental}$ is negligible and does not have to be considered by the logic circuitry 106.

By drawing a total current amount equivalent to the predetermined amount of current, not only does the peripheral device draw a maximum current allowed from the voltage source, but the electronic device also recognizes the peripheral device is plugged in, thereby allowing communication between the peripheral device and the electronic device.

The variable resistor 110 can include resistors in series or in parallel. Each resistor can have a corresponding switch that controls whether current flows through the respective resistor. The variable resistor 110 will be described further below in reference to FIGS. 2 and 3.

Figure 2:
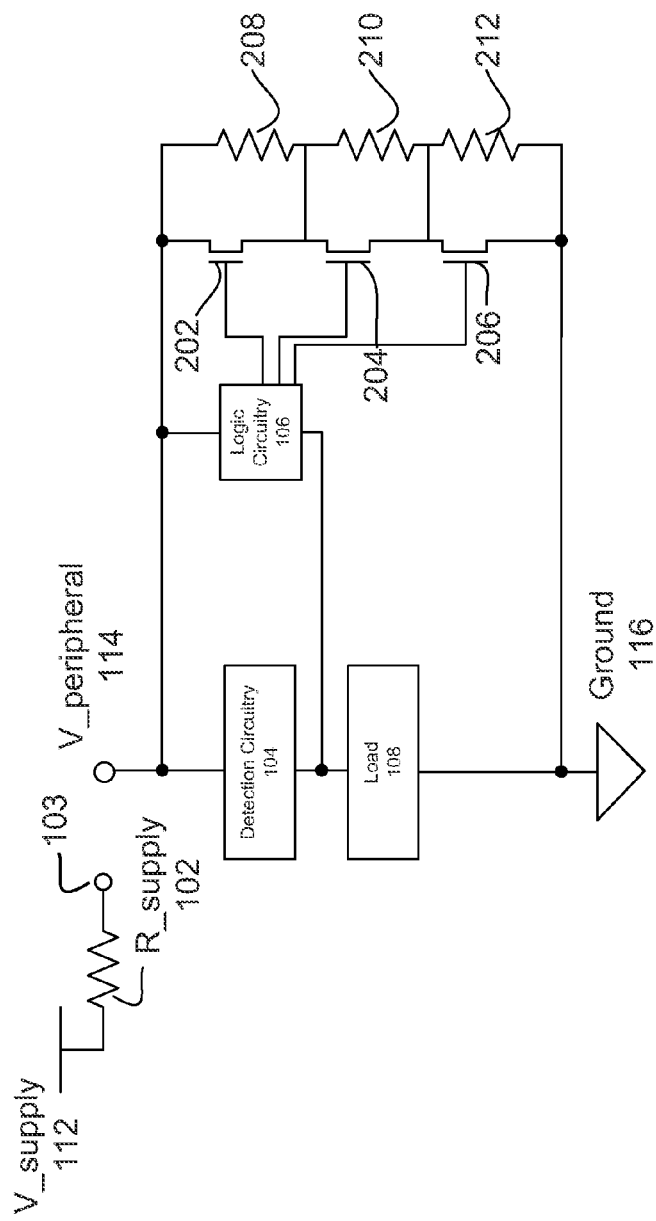
FIGS. 2 and 3 are schematic illustrations including example variable resistors for sourcing current using an audio jack.

FIG. 2 is a schematic illustration including an example variable resistor, e.g., the variable resistor 110 in reference to FIG. 1, for sourcing current using an audio jack. In some implementations, the variable resistor includes resistors 208, 210, and 212 in series with a bypass switch that runs parallel to each resistor. The resistors 208, 210, and 212 can each have different, e.g., increasing, resistance values, and can correspond to switches 202, 204, and 206, respectively. The logic circuitry 106 can control the switches 202, 204, and 206 with digital signals. For example, the detection circuitry 104 can detect a first current amount being drawn by the load 108. The first current amount can be provided to the logic circuitry 106 by the detection circuitry 104. The logic circuitry 106 can determine a second current amount to be drawn from the variable resistor. The second current amount can be the difference between a predetermined current value for the electronic device and the first current amount. At least a portion of either the first current amount or the second current amount can be used for additional operations, e.g., powering circuitry of the peripheral device or recharging a battery of the peripheral device.

The logic circuitry 106 configures switches 202, 204, and 206 to draw the second current amount from a voltage source. For example, if the variable resistor can draw the second current amount by having current flow through resistors 210 and 212 in series, the logic circuitry 106 can output a one signal to switch 202 and zero signals to switches 204 and 206. This allows the second current amount to bypass resistor 208 through the closed switch 202 and to flow through resistors 210 and 212.

Figure 3:
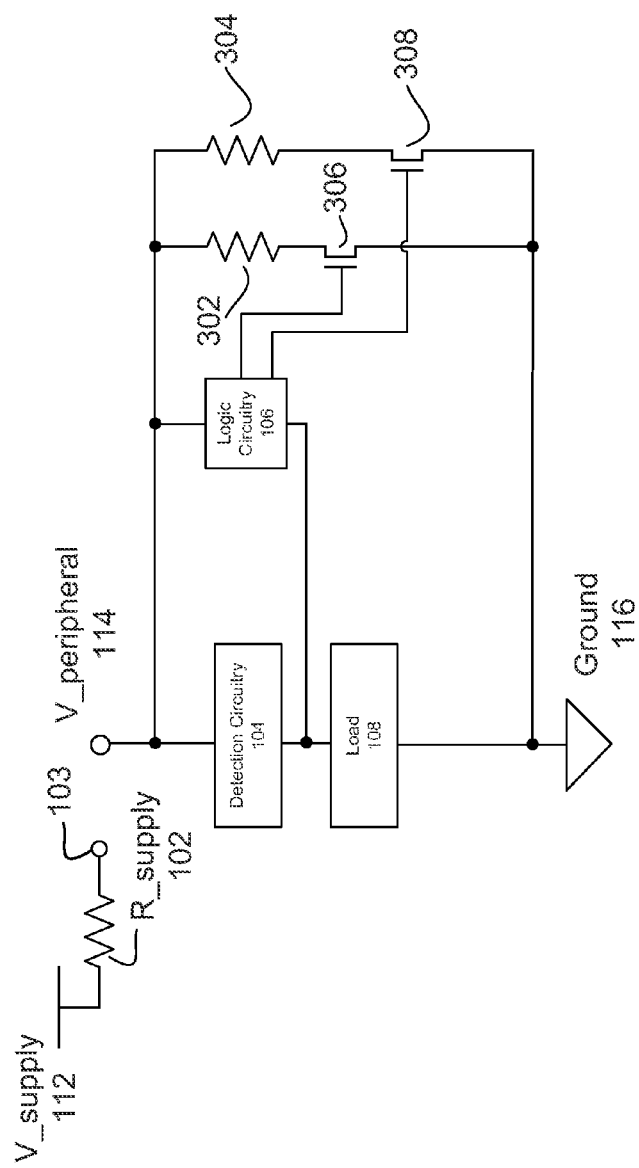

FIG. 3 is another schematic illustration including an example variable resistor, e.g., the variable resistor 110 in reference to FIG. 1, for sourcing current using an audio jack. Instead of resistors being in series as shown in FIG. 2, resistors 302 and 304 can be in parallel. Each resistor 302 and 304 can be coupled with a corresponding switch 306 and 308, respectively, in series. The logic circuitry 106 can determine a second current amount similar to that described in reference to FIG. 2. The logic circuitry 106 can draw the second current amount by controlling switches 306 and 308. For example, if the variable resistor can draw the second current amount by having current flow through resistor 304, the logic circuitry 106 can output a one signal to switch 308 and a zero signal to switch 306. This allows the second current amount to flow through the resistor 304 and not the resistor 302.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A peripheral device configured to be plugged into an audio jack of an electronic device, comprising:
    an audio plug having an input terminal;
    a load electrically connected to the input terminal of the audio plug and configured to draw a first amount of current;
    a variable resistor electrically connected to the input terminal;
    a sensor configured to measure a voltage at the input terminal or an amount of current flowing into the load; and
    a controller that receives a signal from the sensor and is configured to control a resistance of the variable resistor such that a sum of the first amount of current and a second amount of current flowing through the variable resistor is substantially equal to a predetermined current value.

2. The peripheral device of claim 1, where the load is a microprocessor.

3. The peripheral device of claim 1, where the sensor measures voltage and the controller uses a feedback loop to control the resistance.

4. The peripheral device of claim 1, where the variable resistor comprises a plurality of resistors in series.

5. The peripheral device of claim 1, where the variable resistor comprises a plurality of resistors in parallel.

6. A method of sourcing current from an audio jack of an electronic device, comprising:
    determining a voltage drop across a load or a first current amount that is passed to the load, wherein the load is powered at least in part by a voltage source;
    determining, based on the voltage drop or the first current amount, a second current amount to draw from the voltage source using first circuitry; and
    drawing a second current amount through second circuitry, wherein the second circuitry draws current from the voltage source based on output of the first circuitry, where a sum of the first current amount and the second current amount is substantially equivalent to a predetermined current value, where the predetermined current value is defined by the electronic device.

7. The method of claim 6, where the first circuitry includes an analog to digital convertor, and where the first circuitry outputs a plurality of digital signals to the second circuitry; and
    where the second circuitry includes a plurality of resistors, where each resistor is coupled to a corresponding switch, and where each switch is controlled by a corresponding digital signal of the plurality of digital signals.

8. The method of claim 7, where each of the plurality of resistors are in parallel with each other.

9. The method of claim 7, where each of the plurality of resistors are in series with each other.

10. The method of claim 6, where the second circuitry includes a variable resistor, and where the variable resistor is modified by the first circuitry.

11. The method of claim 6, where the load is a card reader.

12. The method of claim 6, where the second circuitry is in parallel to the load.

13. The method of claim 6, where the load is grounded.

14. A system for sourcing current from an audio jack of an electronic device, comprising:
   first circuitry that includes a load and detection circuitry configured to detect a voltage drop across the first circuitry or a first current amount that flows to the first circuitry, where the first circuitry is coupled to a voltage source;
   second circuitry configured to determine whether to draw a second current amount from the voltage source based on the first current amount or the voltage drop, where the second circuitry is coupled to the detection circuitry; and
   third circuitry configured to draw current from the voltage source, where portions of the third circuitry is coupled or decoupled to the voltage source based on output of the second circuitry, where the third circuitry is coupled to the voltage source, and where a sum of the first current amount and the second current amount is substantially equivalent to a predetermined current value, where the predetermined current value is defined by the electronic device.

15. The system of claim 14, where the load and the detection circuitry are in series.

16. The system of claim 14, where the second circuitry includes an analog to digital convertor, and where the second circuitry outputs a plurality of digital signals to the third circuitry; and
   where the third circuitry includes a plurality of resistors, where each resistor is coupled to a corresponding switch, and where each switch is controlled by a corresponding digital signal of the plurality of digital signals.

17. The system of claim 16, where each of the plurality of resistors are in parallel with each other.

18. The system of claim 16, where each of the plurality of resistors are in series with each other.

19. The system of claim 14, where the third circuitry includes a variable resistor, and where the variable resistor is adjusted by the output of the second circuitry.

* * * * *